2,960,003
PHOTOELECTRIC LIGHT METER

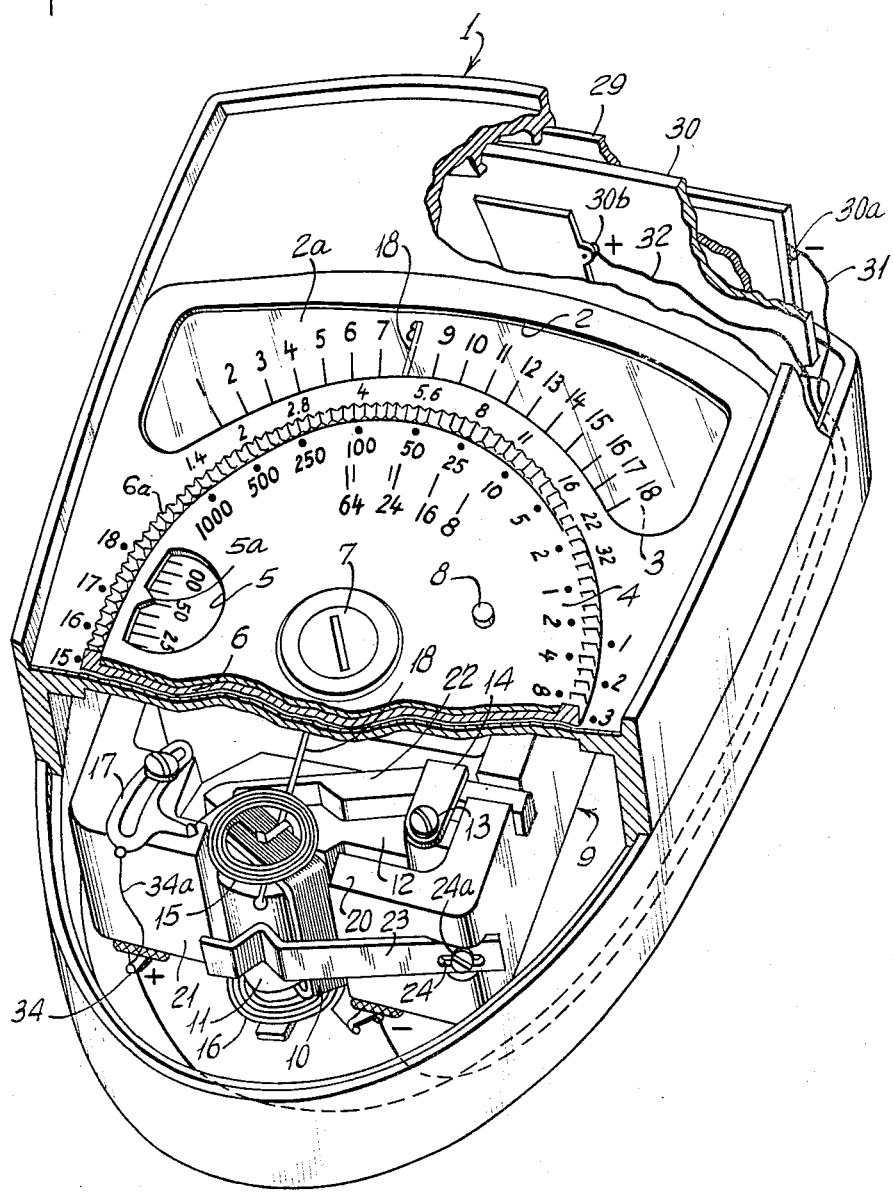

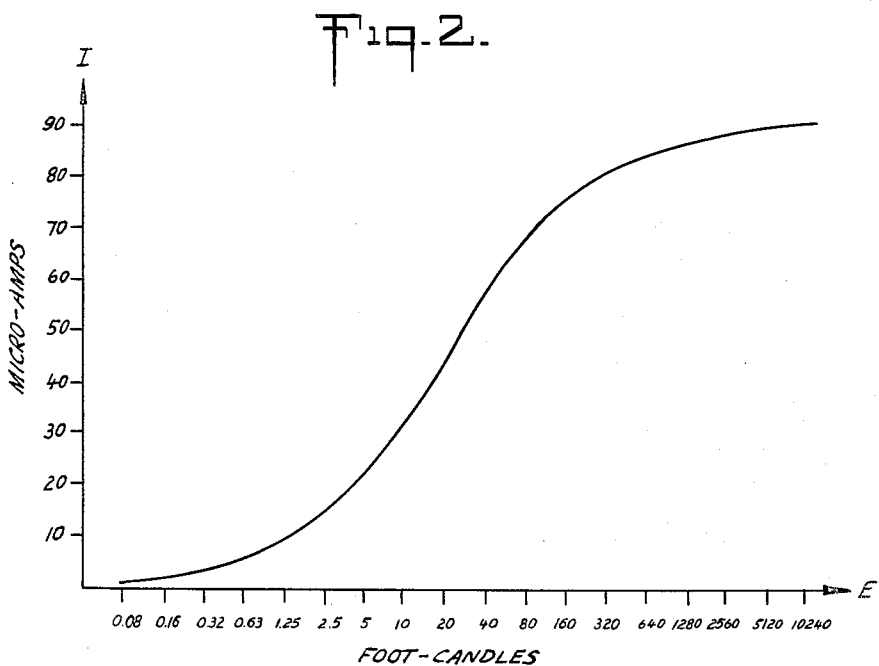
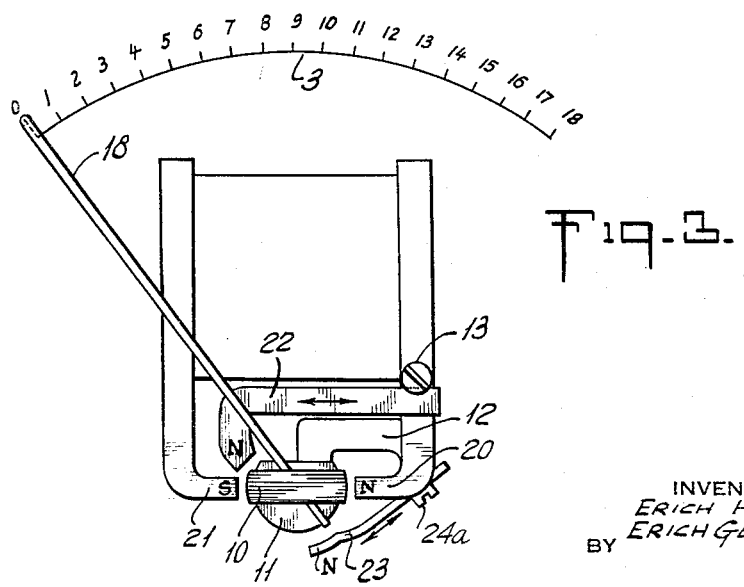

Erich Hahn and Erich Geissler, Dresden, Germany, assignors to VEB Kamera- und Kinowerke Dresden Filed Mar. 15, 1957, Ser. No. 646,262

2 Claims. (Cl. 88—23)

The present invention relates to small measuring instruments of the type having a rotary deflection coil surrounded by magnets and designed, with the aid of means imparting to the coil special response characteristics, for use as photo-electric light or exposure meters.

Photo-sensitive elements are generally characterized by the fact that their internal resistance decreases rapidly with increasing intensity of illumination. These changes of internal resistance have a very marked effect on the flow of electric current in the external current circuit because the total external resistance of the instrument, which is essentially constituted by the resistance of the rotary coil of the measuring mechanism and, depending on the type of circuit, also by an additional series or parallel resistance, remains constant over the entire measuring range. Thus, there arise variable light intensity to current relationships over the entire light measuring range. The current in the external circuit of the light-sensitive or photo-electric element, in other words, is dependent not only on the intensity of illumination but also on the external circuit resistance.

This variability or non-linearity of the response of the instrument to illumination intensity gives rise to the considerable disadvantage that the deflection of the meter needle or pointer is not constant for each unit or predetermined variation of light intensity, being greater over a certain (usually the middle) part of the measuring range than over other (usually the beginning and end) parts thereof. If this non-linearity of response is not compensated for, then the maximum attainable measuring or deflection range will, of course, be relatively small due to the fact that light meters are of necessity limited in size and overall physical dimensions. On the other hand, whenever it has been heretofore desired to compensate for this non-linearity of response, it was found that the measuring mechanisms became extremely complex and that manufacture of light meters equipped with such mechanisms was both difficult and expensive.

It is an important object of the present invention, therefore, to provide a rotary coil-type light or exposure meter with means imparting to the coil a substantially linear response to variations of light intensity over the entire measuring range.

A related important object of the invention is the provision of a light meter with means tending to reduce the pointer deflection per unit change of illumination intensity in the central part of the overall measuring range and tending to increase the pointer deflection per unit change of illumination intensity at the upper and lower ends of the measuring range.

Another object of the invention is to modify the magnet system of a light or exposure meter in such a manner as to keep the rotary coil, throughout its entire range of rotation, in a magnetic field of predetermined flux line and strength characteristics.

It is still another object of the invention to incorporate adjustable auxiliary pole means in the magnet system of a rotary coil-type measuring instrument for the purpose of imparting to the magnetic field through which the coil moves desired physical characteristics leading to linear rotational response of the coil to unit variations of a stimulus generating a flow of electric current in said coil.

A further object of the invention is to impart to a measuring instrument as aforesaid the desired linear response characteristics in as simplified a manner as possible, thereby to avoid undue complication of the measuring mechanism as well as excessive increase of production costs.

More particularly, the invention is characterized by the fact that the pointer-carrying rotary coil of the meter is successively subjected, upon being swung out of its null position, to the action of two additional, oppositely located auxiliary magnetic poles which are connected to a common one of the two main magnetic poles and thus exhibit the polarity of said common main pole. The free end of one of the auxiliary magnetic pole pieces lies in the immediate vicinity of the opposite main magnetic pole, while the free end of the other auxiliary magnetic pole piece is spaced a small distance from that main magnetic pole to which both the auxiliary poles are connected.

A further refinement of the invention provides for adjustable arrangement of both auxiliary magnetic pole pieces so that their positions relative to one another and relative to the rotary coil can be varied for the purpose of predetermining the indicator deflection in the various measuring ranges. By virtue of this adjustability of the auxiliary magnetic poles, correction of the indication of the measuring instrument is greatly facilitated.

The foregoing and other objects, characteristics and advantages of the invention will become more clear from the following description when taken in conjunction with the accompanying drawings, in which:

Fig. 1 is a perspective view of a light meter, parts of the meter housing being broken away to show the photoelectric sensing element and the rotary coil surrounded by a magnet system according to the present invention;

Fig. 2 is a graph showing a plot of coil current against illumination intensity; and Fig. 3 is a fragmentary and semi-schematic illustration of the working elements of an embodiment of the light meter of Fig. 1.

Referring first to Fig. 2, it will be seen that the graph there reproduced illustrates the relationship between intensity of illumination E measured in foot candles and the resulting photoelectric current I measured in microamperes for a particular external resistance of approximately 5000 ohms. The intensity of illumination is plotted along the abscissa to a logarithmic scale, and in view of the conditions normally encountered in photography, the logarithm base 2 is employed, since for all practical purposes only doubling of the light brings about visible shading differences.

The varying slope of the curve shows that the rate of change of the photoelectric current in the range of smallest illumination intensities up to about 1.25 foot candles is very small, that in the range of medium illumination intensities between 1.25 and 160 foot candles the current increases very rapidly, and finally that in the range of the highest illumination intensities, above approximately 160 foot candles, the rate of current change decreases again. If this current is to be indicated by a conventional measuring instrument, the scale thereof will have the middle indicia spread farther apart than the end indicia which is undesirable since the upper end indicia may fall off scale. In accordance with the invention, however, the magnet system is so modified that the indicator or pointer of the instrument rotates through an approximately constant angle for each doubling of the illumination intensity.

Referring now more specifically to Fig. 1, it will be seen that the light meter according to the invention comprises a housing or casing 1 provided in its upper wall or surface with a cut-out or window 2 covered by a plate of glass or transparent plastic material 2a on or through which may be seen a scale 3 the indicia of which range from 1 to 18. Positioned on the upper casing wall and one above the other are two setting discs 4 and 6, both of which are rotatably mounted on a common axle or bolt 7 fixed to the casing 1. The disc 4, on which are marked time or shutter speed values ranging, for example, from 8 seconds to 1/1000 second, is provided adjacent its periphery with an opening or window 5 through which can be seen a scale of film sensitivity values arranged on the disc 6, an indicator 5a formed at one edge of the opening 5 reading over the film sensitivity scale. The disc 4 has a gripping knob 8 on its upper surface, while the disc 6 is provided with a knurled gripping edge 6a. Disposed between the discs 4 and 6 are suitable friction means (not shown), such as a washer or friction lining, by means of which the discs are releasably coupled to one another.

Mounted in the instrument casing or housing 1 is a rotary coil 10 which carries a pointer 18 reading over the scale 3 and pivots about an iron core 11 fixed to a bracket or support 12. Facing one another and located adjacent opposite sides of the coil 10 are two pole pieces 20 and 21 of a permanent magnet 9, the pole pieces 20 and 21 constituting the main magnetic poles of the magnet system. The support 12 is fixedly connected to the main pole piece 20.

In accordance with the present invention, two auxiliary magnetic pole pieces 22 and 23 are adjustably arranged on the pole piece 20, the auxiliary pole piece 22 being held by means of a clamping member 14 releasably connected to the main pole piece 20 by a screw 13, and the auxiliary pole piece 23 being adjustable on the main pole piece 20 by means of an elongated slot 24 through which extends a screw 24a. Upon loosening of the screws 13 and/or 24a, the positions of the auxiliary magnetic pole pieces 22 and 23 relative to the main magnetic pole pieces 20 and 21 can be varied for the purpose of presetting the pointer deflection in the individual measuring ranges.

Mounted in the housing 1 behind a window 29 is a photoelectric cell or element 30 to the terminals 30a and 30b of which are connected current conductors 31 and 32, respectively, leading to terminals 33 and 34 for the rotary coil 10. The coil is provided at its upper and lower parts with a pair of spiral springs 15 and 16 which exert a return or counter-torque on the coil 10. For the purpose of adjusting the coil into any desired null position, the upper spiral spring 15 is fixed to a displaceable lever 17 to which the terminal 34 is connected by a lead 34a. The lower spiral spring 16 is connected to the conductor 31 via the terminal 33. Fig. 3 shows in detail the working elements of the light meter of Fig. 1. A rotary coil 10 carries a pointer 18 reading over the scale 3 and pivots about an iron core 11 fixed to a bracket or support 12. Facing one another and located adjacent opposite sides of the coil 10 are two pole pieces 20 and 21 of a permanent magnet, the pole pieces 20 and 21 constituting the main magnetic poles of the magnet system. The support 12 is fixedly connected to the main pole piece 20. Two auxiliary magnetic pole pieces 22 and 23 are adjustably arranged on the pole piece 20, the auxiliary pole piece 22 being releasably connected to the main pole piece 20 by a screw 13, and the auxiliary pole piece 23 being adjustable on the main pole piece 20 by means of a screw 24a. Upon loosening of the screws 13 and/or 24a, the positions of the auxiliary magnetic pole pieces 22 and 23 relative to the magnetic pole pieces 20 and 21 can be varied.

The operation of the measuring instrument is as follows:
In the null position, i.e., when the photo-sensitive cell or element 30 generates no current due to an absence of illumination, the rotary coil 10 is aligned with and located exactly between the two main magnetic pole pieces 20 and 21. The width of each of these pole pieces is at most as great as the width of the coil. By virtue of this constructional feature, the rotary coil 10 has its legs located directly in front of the main magnetic pole pieces when the current output of the photo-sensitive element 30 is at a minimum, i.e., during the smallest illumination intensity. In this case, the air gap between the coil 10 and the magnetic pole pieces 20 and 21 is also at a minimum.

Upon increasing intensity of illumination, the element 30 generates considerably more current and the rotary coil 10, as a consequence thereof, rotates out of the effective range of the pole pieces 20 and 21. The magnetic field, however, includes a portion generally called the "magnetic scatter field" or stray field which extends laterally of the main pole pieces 20 and 21, whereby the scale intervals corresponding to the pointer deflection resulting from an increase of the illumination intensity on the element 30 would tend to become very large. For reasons of easy readability of the entire scale of the instrument, it is, therefore, essential that this defect be avoided.

This object is attained by the presence on the main magnetic pole piece 20 of the auxiliary magnetic pole piece 22 having the same polarity. The normal magnetic scatter field produced by the magnetic pole pieces 20 and 21 is, thus, strongly deviated to one side by the auxiliary magnetic pole piece 22 so that the rotary coil, upon flow of current therethrough in this position or working region, is influenced only by a greatly reduced and weakened magnetic scatter field. The extent of weakening of the magnetic scatter field by the auxiliary pole piece 22 depends on the position of this auxiliary pole piece relative to the main pole piece 21, and the scale intervals so attained are rendered considerably smaller than those heretofore obtained without the use of an auxiliary magnetic pole piece. By corresponding dimensioning and adjustment of the auxiliary magnetic pole piece 22, it is, accordingly, possible to make use of uniform scale intervals which, in comparison to the conventional spread apart scale intervals, are crowded together.

Upon further increase of the illumination intensity on the element 30, the inner resistance of the latter, as is well known, decreases continuously, so that due to the effect of the constant external resistance offered by the rotary coil 10 the current no longer increases at the same rate. This would normally result at the upper end of the measuring range, as mentioned hereinabove, in a crowding of the scale intervals or markings. This defect is eliminated by the second auxiliary magnetic pole piece 23 which, as may be seen from Fig. 1, has the same polarity as the main pole piece 20 and auxiliary pole piece 22.

The auxiliary pole piece 23 brings about the formation of a strengthened magnetic scatter field at the location in which the distance between the auxiliary pole piece 23 and the iron core 11 is smallest, so that an increased rotational moment or torque is imparted to the rotary coil 10 by this strengthened magnetic scatter field, whereby the deflection of the pointer is extended and the scale intervals at the upper end of the measuring range spread apart relative to the middle scale intervals. Through corresponding dimensioning and adjustment of the auxiliary pole piece 23, the widths of these scale intervals too can be varied at will. The coaction of the auxiliary magnetic pole pieces 22 and 23 enables, wherever desired, attainment of constant scale intervals over the entire range of deflection of the pointer 18.

It will thus be readily realized that the rotary coil 10, upon leaving its null or rest position between the main magnetic pole pieces 20 and 21, comes first into the region of magnetic action of the auxiliary pole piece 22 and thereafter into the region of magnetic action of the auxiliary pole piece 23.

In use of the herein disclosed photoelectric light meter, the disc 4 is normally set or adjusted prior to the measurement relative to the film sensitivity scale-carrying disc 6 located therebelow. If it is necessary or desired to displace one of these discs relative to the other, for example, for setting of the film sensitivity, the setting disc 4 is held stationary through gripping of the knob 8 while the disc 6 is gripped at the knurled rim 6a and rotated until the indicator 5a is located opposite the film sensitivity value to which the meter is to be set. Now the light coming from the object being photographed is permitted to fall onto the photo-sensitive element 30. As soon as the latter receives this light, the rotary coil 10 moves so as to shift the pointer 18 along the scale 3. The index mark at which the pointer 18 stops can then be easily read off.

Arranged about the discs 4 and 6 and on the housing 1 are further scale numbers 1 to 18 (only partly shown in Fig. 1) corresponding to those of the scale 3. The number indicated by the pointer 18 is employed in further setting of the light meter. The disc 6, which is also provided with an indicator (not shown) similar to the indicator 5a, is rotated until this indicator is located at that one of the numbers 1 to 18 on the housing identical with the one at which the pointer 18 has come to rest. After this setting, the exposure time and the associated objective shutter value can be read off. The shutter value or shutter opening ratios 1:1.4 to 1:32 are arranged on the housing 1 in such a manner that they are directly opposite the time setting values 8 to $\frac{1}{1000}$ located on the disc 4.

On the disc 4, furthermore, are provided not only the exposure times for cameras but also picture frequencies 8, 16, 24 and 64, i.e., the average number of pictures per second taken by movie cameras.

The scale division for the illumination intensity shown in Fig. 2 corresponds throughout to the scale divisions 1 to 18 shown in Fig. 1.

It will, of course, be understood that the present invention is susceptible to a number of modifications and variations from the illustrated form thereof without any departure from the scope of the invention as defined in the appended claims. Merely by way of example, the shapes and positions of the auxiliary magnetic pole pieces will depend on the strength and shape of the main pole pieces as well as on the nature of the scale 3, i.e., on whether the latter is curved, as shown, or straight.

What we claim is:

1. In a photoelectric light meter having a casing, an exposable photoelectric cell mounted in said casing, a scale mounted in said casing adapted for viewing light readings, a needle indicator adjacent said scale, a rotary coil mounted in said casing and mechanically secured to said needle movable angularly from a null position to a plurality of deflection positions, first and second main magnetic pole pieces of opposite polarity disposed on opposite sides of said coil and aligned with the same when it is in said null position thereof, said photoelectric cell being responsive to illumination and electrically connected to said coil, means for reducing the stray magnetic field adjacent the second main pole piece, said means including a first auxiliary magnetic pole piece magnetically connected to and extending from and having the same polarity as the first of said main magnetic pole pieces, the free extremity of said first auxiliary pole piece being located on a first side of said coil intermediate said main pole pieces and closely adjacent the second main pole piece, and means for strengthening the magnetic field in a region relatively close to the first main pole piece, said last means including a second auxiliary magnetic pole piece connected to and extending from and having the same polarity as said first main pole piece, the free extremity of said second auxiliary pole piece being located on a second side of said coil opposite said first side and intermediate said main pole pieces but at a greater distance from said first main pole piece than said first auxiliary pole piece is from said second main pole piece, whereby the movement of said coil between said null and deflection positions is maintained substantially uniform for predetermined logarithmic changes of illumination falling on said photoelectric means.

2. In a light meter according to claim 1; respective means operatively connected to said first main pole piece and to each of said auxiliary pole pieces for releasably clamping the latter to said first main pole piece, whereby the positions of said free extremities of said auxiliary pole pieces relative to one another and to said main pole pieces may be varied to thereby adjust the flux line characteristics of the magnetic field generated by said main pole pieces.

References Cited in the file of this patent

UNITED STATES PATENTS

| | | |
|---|---|---|
| 2,505,265 | Urk | Apr. 25, 1950 |
| 2,537,221 | Hickok | Jan. 9, 1951 |
| 2,648,254 | Stimson et al. | Apr. 11, 1953 |
| 2,730,009 | Poierette | Jan. 10, 1956 |

FOREIGN PATENTS

| | | |
|---|---|---|
| 561,095 | Germany | Oct. 10, 1932 |
| 416,553 | Great Britain | Sept. 17, 1934 |
| 518,919 | Great Britain | July 7, 1939 |
| 755,264 | Great Britain | Aug. 22, 1956 |
| 289,406 | Italy | Oct. 16, 1931 |